(12) United States Patent
Smus et al.

(10) Patent No.: US 9,848,036 B1
(45) Date of Patent: Dec. 19, 2017

(54) SYSTEMS, METHODS, AND MEDIA FOR CAUSING AN ACTION TO BE PERFORMED ON A USER DEVICE

(71) Applicant: Google Inc., Mountain View, CA (US)

(72) Inventors: Boris Smus, San Francisco, CA (US); Alejandro Jose Kauffmann, San Francisco, CA (US); Christian Plagemann, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 209 days.

(21) Appl. No.: 14/095,374

(22) Filed: Dec. 3, 2013

(51) Int. Cl.
*H04L 12/02* (2006.01)
*H04L 29/08* (2006.01)
*H04L 12/24* (2006.01)

(52) U.S. Cl.
CPC .............. *H04L 67/10* (2013.01); *H04L 41/22* (2013.01)

(58) Field of Classification Search
CPC ....................... G06F 3/0484; G05B 2219/2615
See application file for complete search history.

(56) References Cited

U.S. PATENT DOCUMENTS

| | | | | |
|---|---|---|---|---|
| 2004/0204076 A1* | 10/2004 | Kotzin | .................. | G06F 1/1613 455/557 |
| 2005/0169066 A1* | 8/2005 | Kawashima | .......... | G06F 3/0605 365/189.05 |
| 2006/0156307 A1* | 7/2006 | Kunjithapatham | ... | G06F 9/4843 718/103 |
| 2007/0063012 A1* | 3/2007 | Hollins | ............. | G06F 17/30879 235/375 |
| 2010/0085275 A1* | 4/2010 | Inami | ....................... | H04Q 9/00 345/2.3 |
| 2010/0255787 A1* | 10/2010 | Wilson | ................. | H04M 1/7253 455/67.11 |
| 2011/0131520 A1* | 6/2011 | Al-Shaykh | .......... | H04L 12/2807 715/772 |
| 2011/0145427 A1* | 6/2011 | Amento | ............. | H04L 65/1016 709/231 |

* cited by examiner

*Primary Examiner* — Andrey Belousov
*Assistant Examiner* — Seth A Silverman
(74) *Attorney, Agent, or Firm* — Byrne Poh LLP (57) ABSTRACT

Systems, methods, and media for causing an action to be performed on a user device are provided. In some implementations, the systems comprise: a first user device comprising at least one hardware processor that is configured to: detect a second user device in proximity to the first user device; receive a user input indicative of an action to be performed; determine a plurality of candidate devices that are capable of performing the action, wherein the plurality of candidate devices includes the second user device; determine a plurality of device types corresponding to the plurality of candidate devices; determine a plurality of priorities associated with the plurality of candidate devices based at least in part on the plurality of device types; select a target device from the plurality of candidate devices based at least in part on the plurality of priorities; and cause the action to be performed by the target device.

21 Claims, 10 Drawing Sheets

SYSTEMS, METHODS, AND MEDIA FOR CAUSING AN ACTION TO BE PERFORMED ON A USER DEVICE

TECHNICAL FIELD

Systems, methods, and media for causing an action to be performed on a user device are provided.

BACKGROUND

Due to the proliferation of computing devices, many users have multiple devices that they frequently use. In some instances, a user may want to initiate an action on one user device, although another user device might be preferable for performing the action. For example, a user may want to click on a link indicating a phone number to be called from a desktop computer, but have the action, that is, making a phone call, be performed from another device, for example, a mobile phone. In such instances, it can be difficult to identify user devices which are suitable for performing the action as well as to transfer content between the user devices.

Accordingly, it is desirable to provide new systems, methods, and media for causing an action to be performed on a user device.

SUMMARY

Systems, methods, and media for causing an action to be performed on a user device are provided. In accordance with some implementations of the disclosed subject matter, systems for causing an action to be performed by a user device are provided, the systems comprising: a first user device comprising at least one hardware processor that is configured to: detect a second user device in proximity to the first user device; receive a user input indicative of an action to be performed; determine a plurality of candidate devices that are capable of performing the action, wherein the plurality of candidate devices includes the second user device; determine a plurality of device types corresponding to the plurality of candidate devices; determine a plurality of priorities associated with the plurality of candidate devices based at least in part on the plurality of device types; select a target device from the plurality of candidate devices based at least in part on the plurality of priorities; and cause the action to be performed by the target device.

In accordance with some implementations of the disclosed subject matter, methods for causing an action to be performed by a user device are provided, the methods comprising: detecting a second user device in proximity to a first user device using a hardware processor on the first user device; receiving a user input indicative of an action to be performed; determining a plurality of candidate devices that are capable of performing the action, wherein the plurality of candidate devices includes the second user device; determining a plurality of device types corresponding to the plurality of candidate devices; determining a plurality of priorities associated with the plurality of candidate devices based at least in part on the plurality of device types; selecting a target device from the plurality of candidate devices based at least in part on the plurality of priorities; and causing the action to be performed by the target device.

In accordance with some implementations of the disclosed subject matter, non-transitory computer-readable media containing computer executable instructions that, when executed by a processor, cause the processor to perform a method for causing an action to be performed by a user device are provided, the method comprising: detecting a second user device in proximity to a first user device; receiving a user input indicative of an action to be performed; determining a plurality of candidate devices that are capable of performing the action, wherein the plurality of candidate devices includes the second user device; determining a plurality of device types corresponding to the plurality of candidate devices; determining a plurality of priorities associated with the plurality of candidate devices based at least in part on the plurality of device types; selecting a target device from the plurality of candidate devices based at least in part on the plurality of priorities; and causing the action to be performed by the target device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Systems, methods, and media for causing an action to be performed on a user device are provided.

In accordance with some implementations, mechanisms, which can include systems, methods, and/or media, are provided for causing an action to be performed on a user device.

In accordance with some implementations, the mechanisms can detect and automatically establish connections between nearby user devices and then cause an action to be performed on one or more of the nearby user devices. In some implementations, the mechanisms can indicate that a connection has been established between two or more user devices, and/or that the action to be performed can be performed on a connected user device by changing or updating user interfaces on the user devices.

In accordance with some implementations, in instances in which multiple nearby user devices are detected and connected to a source user device, the mechanisms can select one or more target devices out of the set of detected and connected user devices to perform an action indicated by a user. In some such implementations, the target device(s) can be selected based on one or more factors, such as the suitability of a particular device for performing a particular action, the proximity of a candidate device to a source user device, a user's preferences, a user's current state of attention, and/or any other suitable factor(s).

Figure 1:
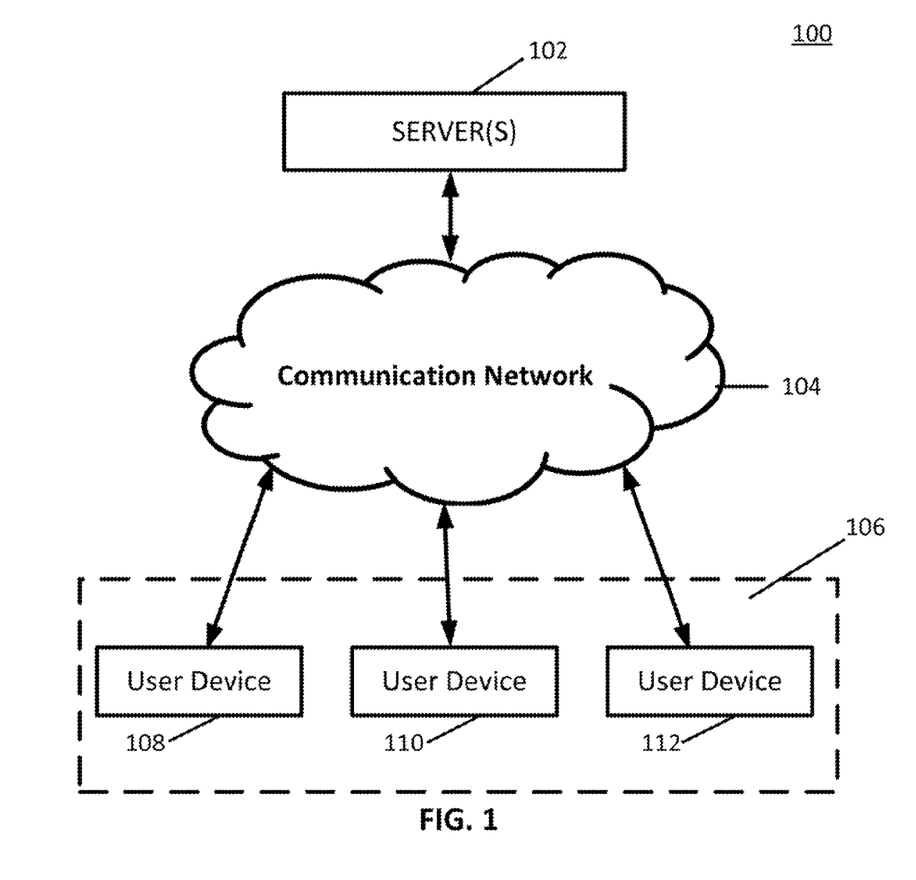
FIG. 1 shows a schematic diagram of an example of a system for causing an action to be performed on a user device in accordance with some implementations of the disclosed subject matter.

Turning to FIG. 1, an example 100 of hardware for causing an action to be performed on a user device that can be used in accordance with some implementations is shown. As illustrated, hardware 100 can include one or more servers 102, a communication network 104, and one or more user devices 106, such as user devices 108, 110, and 112.

Server(s) 102 can be any suitable server(s) for storing and processing information. For example, server(s) 102 can be used to store or determine information related to the current location of one or more user devices 106, store or process information related to user preferences or past user choices, estimate distance between two user devices, etc. In some implementations, server(s) 102 can be omitted.

Communication network 104 can be any suitable combination of one or more wired and/or wireless networks in some implementations. For example, communication network 104 can include any one or more of the Internet, a mobile network, a satellite network, a local area network, a wide area network, a telephone network, a cable television network, a WiFi network, a WiMax network, and/or any other suitable communication network.

User devices 106 can include any suitable one or more user devices for performing actions (e.g., browsing Web sites, making phone calls, opening e-mail, presenting movies, etc.). For example, in some implementations, user devices 106 can include mobile user devices, such as a mobile phone, a tablet computer, a laptop computer, a vehicle (e.g., car, boat, airplane, etc.) entertainment system, a portable media player, etc. As another example, in some implementations, user devices 106 can include non-mobile user devices, such as a desktop computer, a set-top box, a smart television, a streaming media player, a game console, etc.

Although three user devices 108, 110, and 112 are shown in FIG. 1 to avoid over-complicating the figure, any suitable number of each of these user devices, and any suitable types of these user devices can be used in some implementations.

Server(s) 102 and user devices 106 can be implemented using any suitable hardware in some implementations. For example, in some implementations, server(s) 102 and user devices 106 can be implemented using any suitable general purpose computer or special purpose computer. For example, a mobile phone may be implemented using a special purpose computer. Any such general purpose computer or special purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Figure 2:
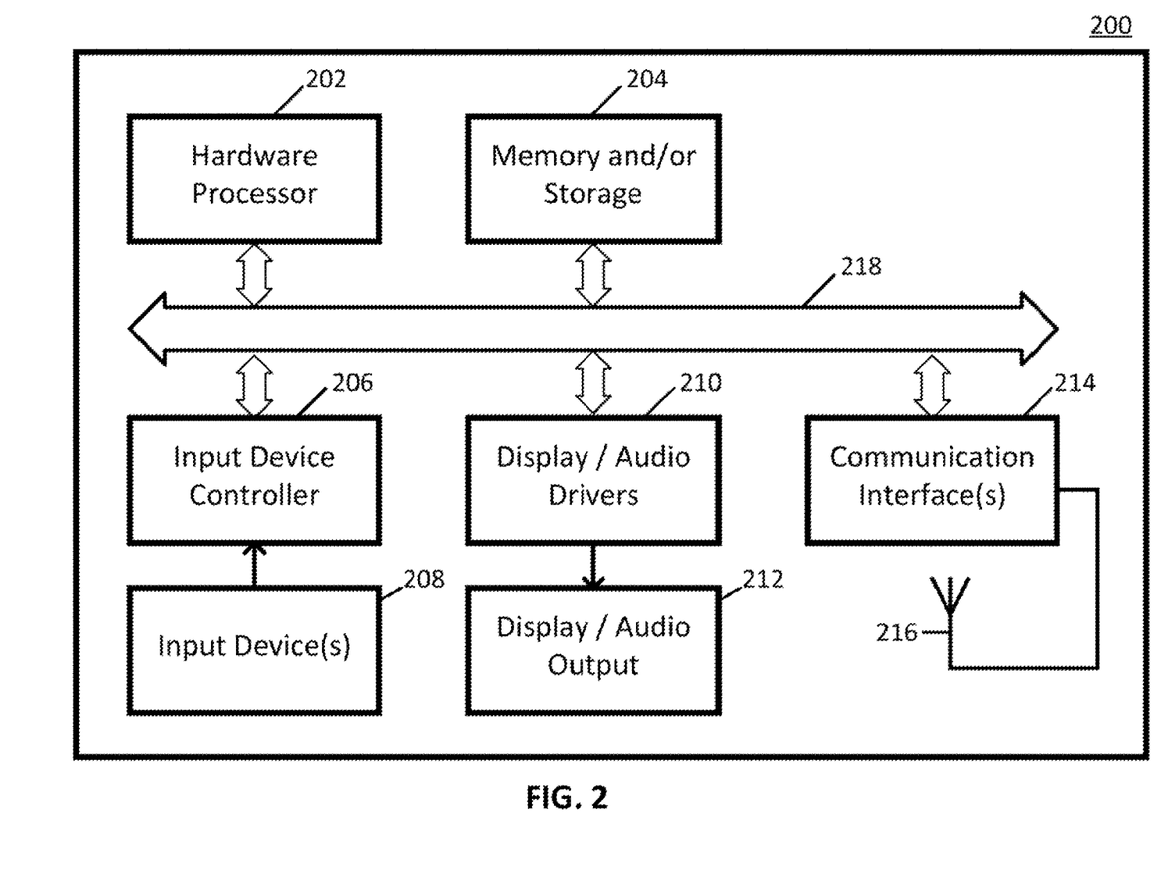
FIG. 2 shows an example of hardware that can be used in a server and/or a user device in accordance with some implementations of the disclosed subject matter.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some implementations Memory and/or storage 204 can be any suitable memory and/or storage for storing programs, data, media content, and/or any other suitable information in some implementations. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some implementations. For example, input device controller 206 can be circuitry for receiving input from a touch screen, for one or more buttons, from a voice recognition circuit, from a microphone, from a camera, from an optical sensor, from an accelerometer, from a temperature sensor, from a near field sensor, and/or any other type of input device. In some implementations, input device controller 206 can be circuitry from receiving input from input devices which function as location and/or proximity sensors, for example, a Global Positioning System (GPS) receiver.

Display/audio drivers 210 can be any suitable circuitry for controlling and driving output to one or more display/audio output circuitries 212 in some implementations. For example, display/audio drivers 210 can be circuitry for driving an LCD display, a speaker, an LED, or any other type of output device.

Communication interface(s) 214 can be any suitable circuitry for interfacing with one or more communication networks, such as networks 110 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some implementations. In some implementations, antenna 216 can be omitted when not needed.

Bus 218 can be any suitable mechanism for communicating between two or more components 202, 204, 206, 210, and 214 in some implementations.

Any other suitable components can be included in hardware 200 in accordance with some implementations.

Figure 3:
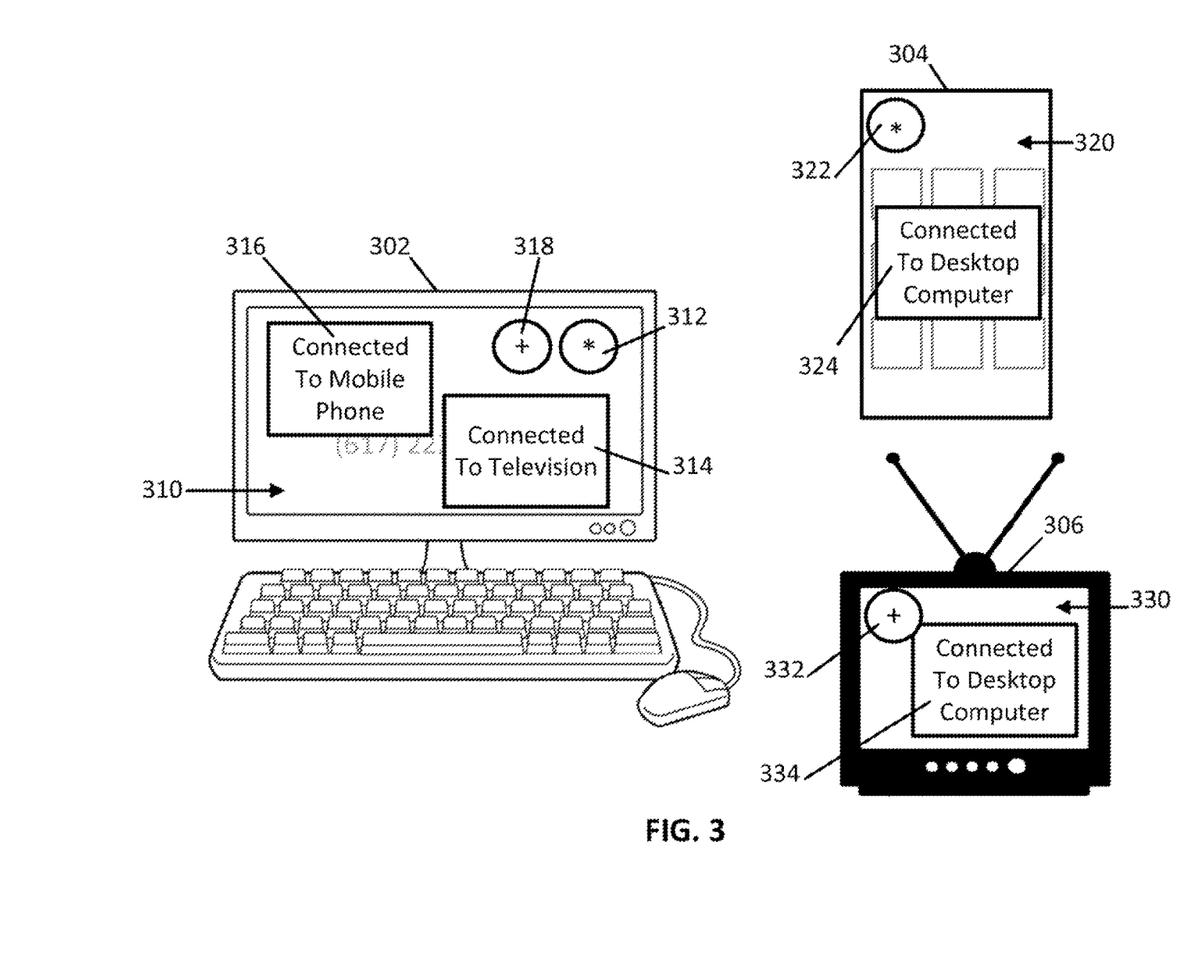
FIG. 3 shows an example of a set of user interfaces for indicating connections between user devices in accordance with some implementations of the disclosed subject matter.

In some implementations, any two or more user devices can be connected to each other. In some such implementations, the existence of the connection between the two or more user devices can be indicated with user interfaces on the connected user devices. FIG. 3 shows a particular example of a set of user interfaces 310, 320, and 330 on user devices 302, 304, and 306 respectively, which indicate connections between the user devices.

A connection between user devices can be indicated via connection indicators 312, 318, 322, and 332. Connection indicators 312, 318, 322, and 332 can be any suitable indicators for presenting a user with the information that user devices are connected. For example, as shown in FIG.

3, connection indicators 312, 318, 322, and 332 can be icons which indicate that user devices 302 and 304 are connected and that user devices 302 and 306 are connected. In some implementations, connection indicators 312, 318, 322, and 332 can indicate the devices or types of devices which are connected. For example, connection indicator 312 can include an icon of a mobile phone, indicating that user device 302 is connected to a mobile phone (that is, user device 304). Connection indicators 312, 318, 322, and 332 can include any suitable text, images, icons, animations, videos, and/or any other suitable content. For example, in some implementations, connection indicators 312, 318, 322, and 332 can include text stating the owners of the connected device(s). In some implementations, connection indicators 312, 318, 322, and 332 can change to indicate the proximity (which can be determined as shown in and described in connection with FIG. 6 for example) of connected user devices to one another. In the particular example illustrated in FIG. 3, if the mobile phone were to move closer to the desktop computer, connection indicators 312 and 322 can grow larger in size. In some implementations, connection indicators 312, 318, 322, and 332 can be omitted.

Further notification about a connection between two user devices can be provided via connection messages 314, 316, 324, and 334. Connection messages 314, 316, 324, and 334 can be any suitable mechanism for alerting a user that connections have been established between user devices. For example, as shown in FIG. 3, connection messages 314, 316, 324, and 334 can include non-modal windows with messages stating that a connection between user devices has been established. In other implementations, messages 314, 316, 324, and 334 can include modal windows with messages stating that a connection between user devices has been established, and further requiring a user to acknowledge and/or approve the connection. In some implementations, messages 314, 316, 324, and 334 can be fixed at a location on a display of the device (e.g., fixed on a task bar). In some implementations, messages 314, 316, 324, and 334 can appear and subsequently be hidden, for example, after user acknowledgement or after a specified period of time has elapsed. In some implementations, messages 314, 316, 324, and 334 can include non-visual alerts (e.g., sound, haptic feedback, or any other suitable type of non-visual alert) of a connection to another device. For example, a tone indicating connection to another device can be played. As a more particular example, the tone played can be indicative of which devices are connected (e.g., a horn for connection to a television, a bell for connection to a mobile phone, or any other suitable pairing of a unique tone with a specific user device).

Figure 4:
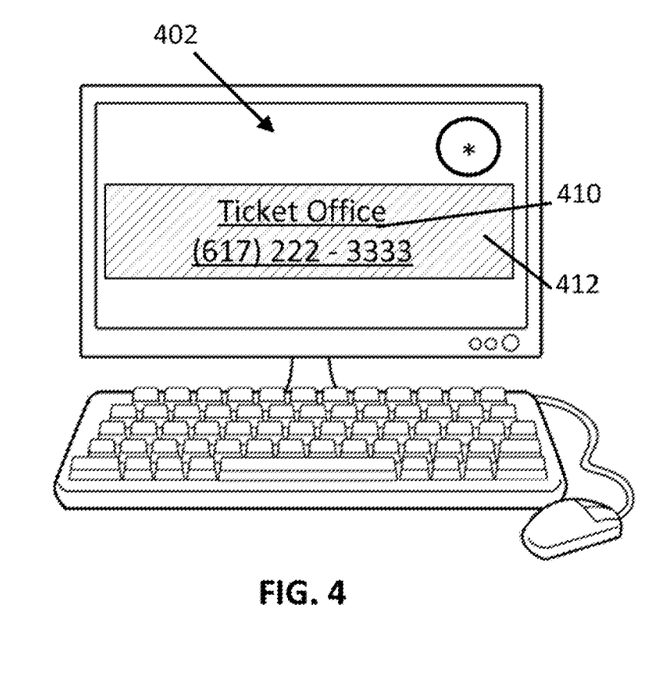
FIG. 4 shows an example of a user interface for indicating that an action can be performed on another connected device in accordance with some implementations of the disclosed subject matter.

User input can be received on a source user device, wherein the user input indicates an action to be performed. In instances where the source user device is connected to one or more other user devices, user interfaces can be presented which indicate that the specified action can be performed by the connected user device(s). In a more particular example, as shown in FIG. 4, a user interface 402 can be presented which can include an indicator 410 of an action to be performed and an indicator 412 that the action can be performed with another connected device.

Indicator 410 can indicate any suitable action to be performed. For example, indicator 410 can include hyperlinks or icons which can be clicked, or any other suitable action. As a more particular example, as shown in FIG. 4, indicator 410 can include a link to a phone number. As another particular example, indicator 410 can include an icon corresponding to an e-mail application. As yet another particular example, indicator 410 can include a play button on a video.

Indicator 412 can be any suitable mechanism for indicating on a user device that the action will be performed with another connected device. For example, as shown in FIG. 4, indicator 412 can include highlighting indicator 410 in a manner (e.g., hashed, a different color, or any other suitable manner of highlighting) that indicates the action will be performed on another, connected device. In some such implementations, the manner of highlighting can be dependent on the type and/or identity of the connected device (e.g., blue highlighting for a mobile phone, red highlighting for a tablet computer, or any other suitable pairing of a manner of highlighting with a specific user device). Indicator 412 can include any suitable text, icon, image, video, animation, or any other suitable content. For example, in some implementations, indicator 412 can include an icon specifying which device an action will be performed on, by, for example, displaying an icon specific to the selected device. In some implementations, indicator 412 can include a non-visual indication that an action will be performed on another, connected device. For example, in some implementations, indicator 412 can include a tone or an audible statement. In some implementations, indicator 412 can be omitted.

Figure 5:
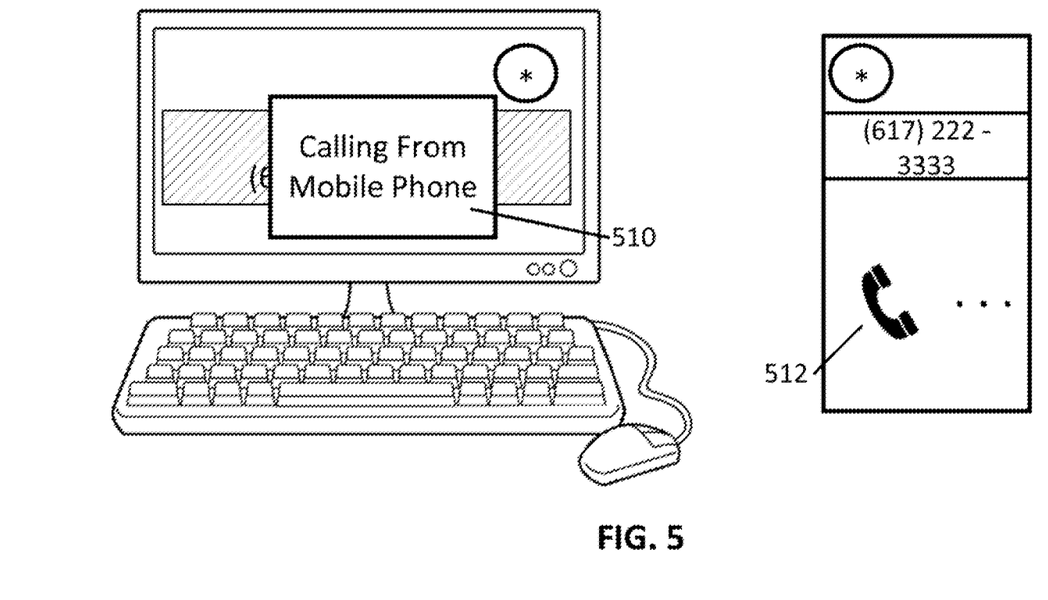
FIG. 5 shows an example of a set of user interfaces for indicating an action specified on a first device is being performed on a second device in accordance with some implementations of the disclosed subject matter.

In some implementations, an action specified on a source user device can be caused to be performed on another connected user device (which can be referred to as a target user device). In some implementations, user interfaces can be presented which indicate that an action specified on the source user device is being performed on another connected user device. In a more particular example, as shown in FIG. 5, a message 510 can be presented on the source user device and an action indicator 512 can be presented on the connected user device which is performing the specified action.

Message 510 can be any suitable mechanism for providing a notification on a user device that an action is being performed on another connected device. For example, as shown in FIG. 5, message 510 can include a non-modal message window with text stating that the action is being performed on another connected user device (e.g., "Calling from mobile phone"). Message 510 can include any suitable text, icons, animations, videos, sounds, and/or any other suitable content. For example, in some such implementations, message 510 can include a tone (e.g., a beep, a horn, a chirp, or any other suitable tone), an audible stated message (e.g., "Calling from mobile phone"), or haptic feedback (e.g., vibration of the source user device). In some implementations, message 510 can be omitted.

Action indicator 512 can be any suitable mechanism for indicating that an action is being performed on a device. As a specific example, as shown in FIG. 5, if the action being performed is making a phone call, action indicator 512 can include an icon or animation indicating that a phone call is being made by the target user device. In some implementations, action indicator 512 can be omitted.

Display of and interaction with the user interfaces shown in and described in connection with FIGS. 3-5 can be executed with one or more components of hardware 200. For example, in some implementations, hardware processor 202 can cause a user interface to be presented on display/audio output 212 (e.g., a monitor, a tablet computer screen, a mobile phone screen, and/or any other suitable display/audio output) by directing display/audio drivers 210 to present the user interface on display/audio output 212. As another example, hardware processor 202 can receive input from a user interface by receiving data passed from input device controller 206, which can receive input from input device 208 (e.g., a keyboard, a mouse, a touch screen, a microphone, and/or any other suitable input device).

Figure 6:
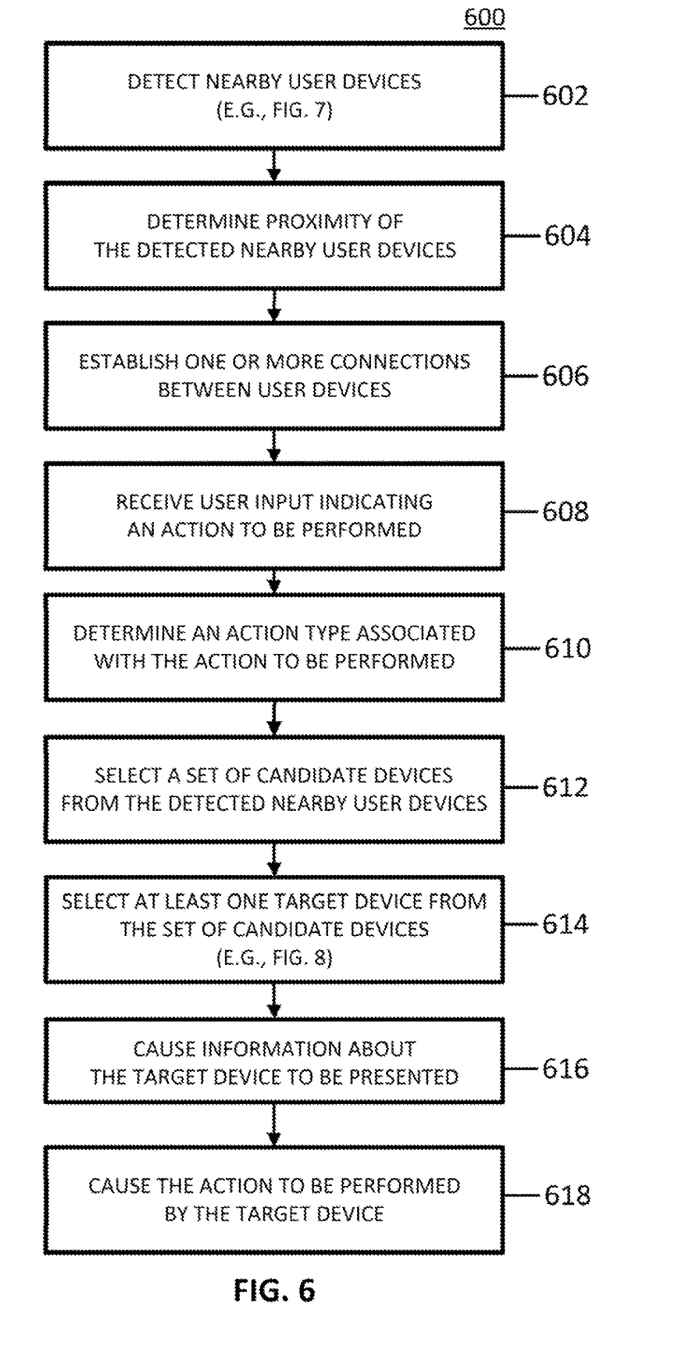
FIG. 6 shows a flow chart of an example of a process for causing an action to be performed on a user device in accordance with some implementations of the disclosed subject matter.

Turning to FIG. 6, a flow chart of an illustrative process 600 for causing an action to be performed on a user device in accordance with some implementations of the disclosed subject matter is shown.

As illustrated, process 600 can begin by detecting nearby user devices at 602. The detection of nearby user devices can be performed in any suitable manner. For example, in some implementations, nearby user devices can be detected by determining whether one or more other devices are within a pre-determined distance range of a source user device, determining whether one or more other user devices are within a pre-determined signal strength range of the source user device, and/or detecting user devices on a common network with the source user device. For example, process 600 can detect one or more communication signals indicating the presence of one or more user devices nearby the source user device. Examples of such communication signals can include one or more BLUETOOTH signals, Near Field Communication (NFC) signals, infrared signals, radio signals, WiFi signals, and/or any other suitable signals that can indicate the presence of a nearby user device. As another example, process 600 can detect multiple user devices connected to a given network and identify a set of nearby user devices based on the locations of the detected devices. In a more particular example, as described below in connection with FIG. 7, process 700 can query a network and request information about the presence and location of other user devices connected to the network.

At 604, process 600 can determine the proximity of the nearby devices. Proximity can be determined in any suitable manner. For example, in some implementations, process 600 can determine proximity by estimating a distance between the source user device and another detected nearby user device (a second user device). The distance can be estimated with any suitable mechanism. For example, process 600 can estimate the distance using an audio pulse method (e.g., an audio time of arrival method) in which the distance can be estimated by the source user device transmitting an audio tone or chirp, directing the second user device to send a signal to the source user device when the tone is first detected by the second user device, and measuring the distance between the devices based on the time it takes for the sound to travel through the air between the devices and the speed of sound through the air. In some such implementations, the distance estimate can be further refined based on any suitable information, such as ambient temperature. As another example, process 600 can estimate the distance between the source user device and other user devices using signals from an external service. As a more particular example, process 600 can estimate the distance between user devices based on locations determined and shared by each device using GPS signals. As another particular example, process 600 can estimate the distance between user devices based on locations determined and shared by each device using mobile device tracking techniques such as triangulation from network radio towers.

Additionally or alternatively, the proximity between the source user device and another detected nearby user device (a second user device) can be determined using the signal strength of connections to a common network. For example, the proximity between the source user device and the second user device can be estimated by comparing the signal strength of each device's connection to a network. As a more particular example, in response to determining that the source user device has a strong connection to a WiFi network and that the second user device has a substantially weaker connection the same WiFi network, process 600 can determine that there is poor proximity between the two devices. In some such implementations, process 600 can further estimate a distance between the two devices based on the difference in signal strengths.

At 606, process 600 can establish one or more connections between user devices. The connections can be established between any suitable number of nearby user devices and in any suitable configuration. For example, in some implementations, a user device can connect to one or more other user devices using information in a signature for each of the other devices, such as device identification numbers, device owner information, permission information, and/or any other suitable information. Additionally or alternatively, a connection can be established between the source user device and another nearby user device by an external device, such as a server.

The connections established by process 600 can be of any suitable type. For example, the types of connection can include a BLUETOOTH link, a WiFi link, a radio transmission link, an infrared communication link, and/or any other suitable communication link. In a particular example, a source user device can establish a BLUETOOTH connection to one or more other user devices by forming piconet networks between the user device and the one or more other user devices.

Process 600 can additionally or alternatively present one or more user interfaces indicating that two or more user devices have been connected. For example, process 600 can present messages or icons indicating connections between user devices, as shown in and described in connection with FIG. 3.

At 608, process 600 can receive user input indicating an action to be performed by a user device. Any suitable type of user input can be received, such as keyboard entries, mouse clicks, gestures, voice commands, or any other suitable type of input. User input can be received in any suitable manner, for example, through infrared signals, radio signals, physical connections, or through any other suitable manner. The received user input can indicate any suitable types of actions that can be performed by a user device, such as an input to begin playing streaming media content, an input to open an application, an input to initiate a phone call, an input to open an e-mail client, and/or any other suitable inputs indicating an action that can be performed by a user device. In some implementations, a user interface indicating the action to be performed can be presented, for example, as shown in and described in connection with FIG. 4.

At 610, process 600 can determine an action type associated with the action to be performed. The action type can be determined in any suitable manner. For example, an action type associated with a particular action can be determined by using a look-up table with multiple action types and corresponding examples of actions of that action type. Example action types can include stream media content, make phone call, open application, and/or any other suitable action type.

At 612, process 600 can select a set of candidate devices capable of performing the action from the detected nearby devices. The set of candidate devices can include the detected nearby devices and can additionally or alternatively include the source user device which received the user input indicating the action to be performed.

Process 600 can select the set of candidate devices in any suitable manner. For example, process 600 can first identify a device type for each of the detected nearby devices. As a specific example, device types can include laptop, mobile phone, desktop computer, tablet computer, television, or any other suitable device type. Process 600 can then select a set of candidate device(s) based on the device types associated with the detected nearby devices and the action type associated with the action to be performed. In a more particular example, in response to determining that the action type is stream media content, process 600 can determine that the set of candidate devices can include user devices with device types of mobile phone, tablet computer, desktop computer, television, laptop computer, and/or any other suitable device type capable of performing that action. As another particular example, in response to determining that the action type is make phone call, process 600 can determine that the set of candidate devices can include user devices associated with device types of mobile phone, tablet computer, and/or any other suitable device types capable of performing that action.

At 614, process 600 can select one or more target devices from the set of candidate devices. This selection can be made in any suitable manner. For example, process 600 can determine a priority score associated with each of the candidate devices. The priority score can be determined based on any suitable information. For example, the priority score can be based on one or more of the device types associated with the candidate devices, the action type associated with the action to be performed, the proximity of each of the candidate devices to the source user device, user preferences, information relating to a current state of user attention, and/or any other suitable factor(s). In some implementations, process 600 can combine information from one or more factors by weighting the information to form a single priority score for each candidate device, for example, as shown in and described in connection with FIG. 8. Process 600 can then select the target device(s) by ranking the set of candidate devices based on their priority scores.

At 616, process 600 can cause information about the selected target device(s) to be presented to the user. For example, process 600 can cause a change in the user interface(s) of the user devices. As a more particular example, process 600 can indicate on the source user device that a target device has been chosen to perform the action, for example as shown in and described in connection with FIG. 5.

At 618, process 600 can cause the action to be performed by the target device(s). Process 600 can cause the action to be performed on the target device(s) in any suitable manner. For example, process 600 can transmit a signal with information about the action to be performed to the target device(s). As a more particular example, the signal can include information about a Uniform Resource Locator (URL) associated with a Web site to be opened, a phone number to be dialed, a link to a video to be streamed, a channel number of a television channel to be tuned, any suitable information about media content to be presented, and/or any other suitable information.

The actions to be performed can include any suitable actions. As a particular example, in response to determining that the action to be performed is making a phone call, process 600 can cause the target device to dial the indicated phone number. As another particular example, in response to determining that the action to be performed is opening a map to a particular location, process 600 can cause a map showing the indicated location to open on the target device(s). As yet another particular example, in response to determining that the action to be performed is opening an email, process 600 can cause the email to be opened on the target device(s). As still another particular example, in response to determining that the action to be performed is opening an instance of media content, process 600 can cause the media content to be opened on the target device(s), and can additionally or alternatively synchronize the presentation of the media content between the source user device and the target device(s) (e.g., by beginning or resuming a presentation of a movie on the target device(s) at the point which was last being presented on the source user device). As yet another particular example, in response to determining that the action to be performed is opening a Web site, process 600 can cause the Web site to be opened on a browser on the target device(s).

Additionally or alternatively, process 600 can present information indicating that the action is being performed on the target device(s) on the source user device and/or on the target device(s). For example, in some implementations, process 600 can present a message on the source user device, as shown in and described in connection with FIG. 5.

Figure 7:
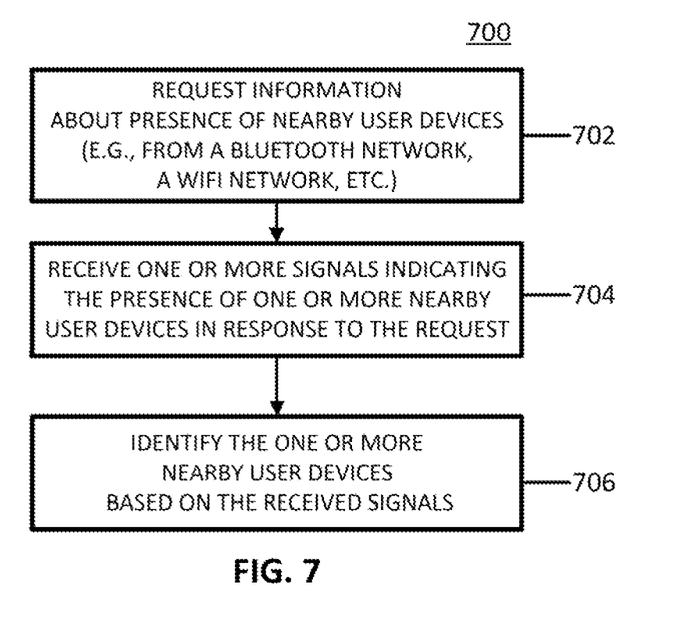
FIG. 7 shows a flow chart of an example of a process for detecting and identifying nearby user devices in accordance with some implementations of the disclosed subject matter.

Turning to FIG. 7, a flow chart of an example process 700 for detecting and identifying one or more nearby user devices is shown in accordance with some implementations.

Process 700 can begin by requesting information about the presence of nearby user devices at 702. The information can be requested in any suitable manner. For example, the information can be requested by querying a network (e.g., a BLUETOOTH network, a WiFi network, or any other suitable type of network). In a more particular example, the query can be implemented by scanning a network for user devices connected to the network.

At 704, process 700 can receive one or more signals indicating the presence of one or more nearby user devices in response to the request for information. The received signals can contain any suitable information and can be received in any suitable manner. For example, the received signals can include a list of device signatures corresponding to nearby user devices determined to be connected to a network. As a more particular example, the device signatures can include information such as device type (e.g., mobile phone, tablet computer, or any other suitable device type), device owner (e.g., John), location of the user device, strength of connection to the network (e.g., two bars), and/or any other suitable information about a user device.

At 706, process 700 can identify one or more nearby user devices based on the received signals (e.g., the device signatures). The identification can be implemented in any suitable manner. For example, process 700 can parse text contained in the device signatures to extract information about a user device. In some implementations, the extracted information can include information about the location of the detected user devices. In some such implementations, process 700 can identify the user devices that are within a pre-determined location range or within a pre-determined location radius. Additionally or alternatively, process 700 can identify N devices within a pre-determined location range, where N is any suitable number of user devices.

Figure 8:
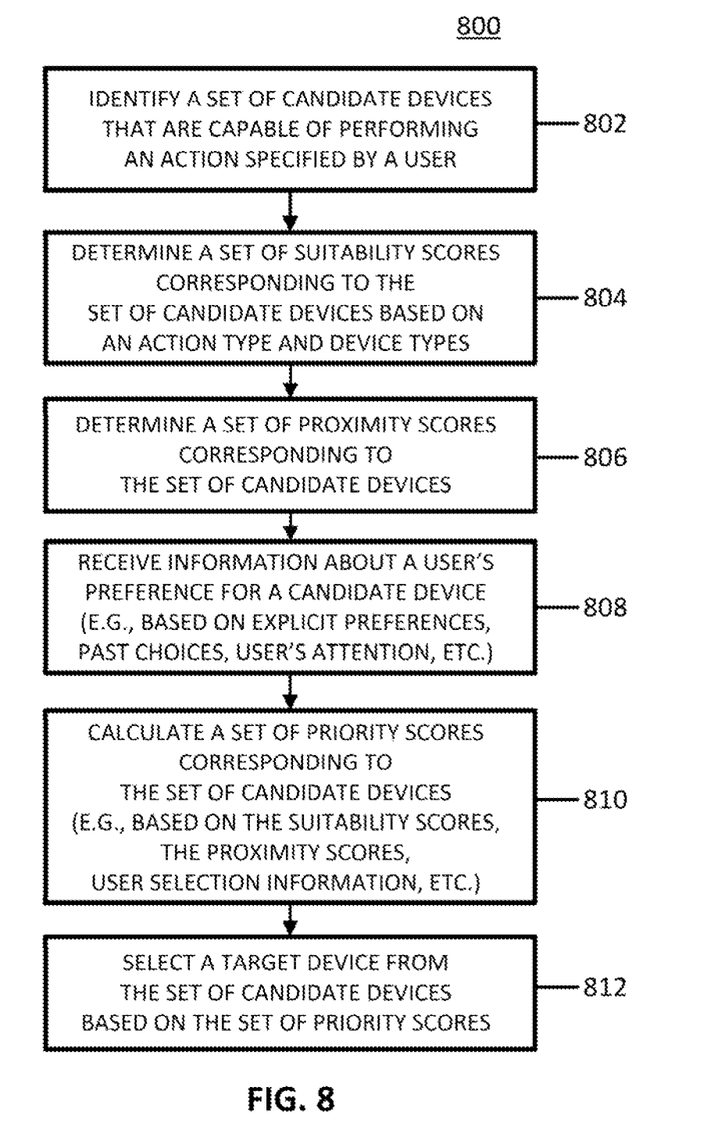
FIG. 8 shows a flowchart of an example of a process for selecting a target device from a set of candidate devices by calculating a priority score in accordance with some implementations of the disclosed subject matter.

Turning to FIG. 8, a flow chart of an example 800 of a process for selecting a target device out of a set of candidate devices is shown in accordance with some implementations.

As illustrated, process 800 can begin by identifying a set of candidate devices that are capable of performing an action specified by a user at 802. The set of candidate devices can be identified in any suitable manner. For example, as described in connection with FIG. 6 above, the set of candidate devices can include multiple nearby user devices that are capable of performing the action.

Next, at 804, process 800 can determine a set of suitability scores for the set of candidate devices. The set of suitability scores can have any suitable format. For example, the set of suitability scores can include a set of ordinal numbers (that is, rankings). As another example, the set of suitability scores can be on any suitable scale (e.g., 0 to 100, 0 to 1, −5 to 5, or any other suitable scale).

The set of suitability scores can be determined in any suitable manner. For example, the set of suitability scores can be determined based on a set of device types associated with the candidate user devices (e.g., mobile phone, tablet computer, desktop computer, television, and/or any other suitable device type). In a more particular example, a higher suitability score can be assigned to a candidate device that is associated with a device type (e.g., mobile phone) that is better suited to perform the action specified by the user (e.g., make a phone call).

Figure 9:
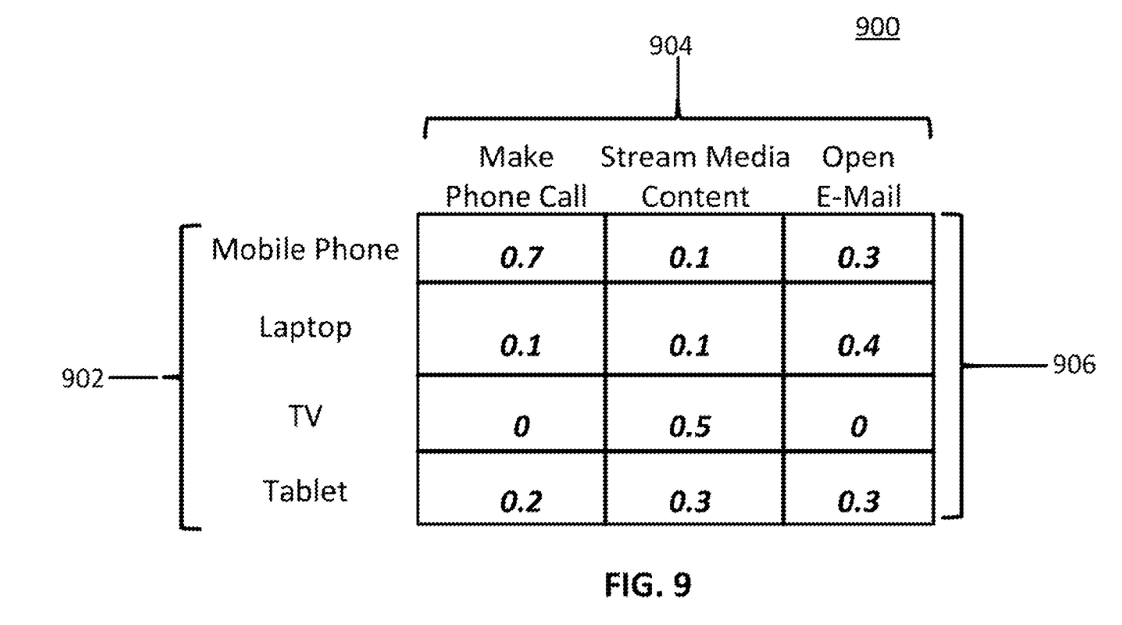
FIG. 9 shows an example of a table of sets of suitability scores corresponding to a set of candidate device types and for sets of action types in accordance with some implementations of the disclosed subject matter.

In another more particular example, the set of suitability scores can be determined based on a predetermined list of suitability scores associated with the set of device types, such as is illustrated in table 900 of FIG. 9. As shown, table 900 can include multiple sets of suitability scores 906 corresponding to a set of device types 902 and a set of actions 904. In some such examples, for a particular type of action (e.g., make a phone call), a set of suitability scores (e.g., 0.7, 0.1, 0, 0.2) associated with a set of device types 902 can be determined based on table 900. In some such implementations, table 900 can be stored in memory and/or storage 204 on a user device 106. Additionally or alternatively, in some implementations, table 900 can be stored in memory and/or storage 204 on a server 102.

Turning back to FIG. 8, process 800 can determine a set of proximity scores corresponding to the set of candidate devices at 806. The proximity scores can be based on any suitable estimate of proximity, including distance between a candidate device and the source user device, signal strength of a candidate device to a given network, and/or any other suitable estimate of proximity. In some implementations, multiple estimates of distance and/or proximity between a candidate device and the source user device can be combined to determine a proximity score.

Figure 10:
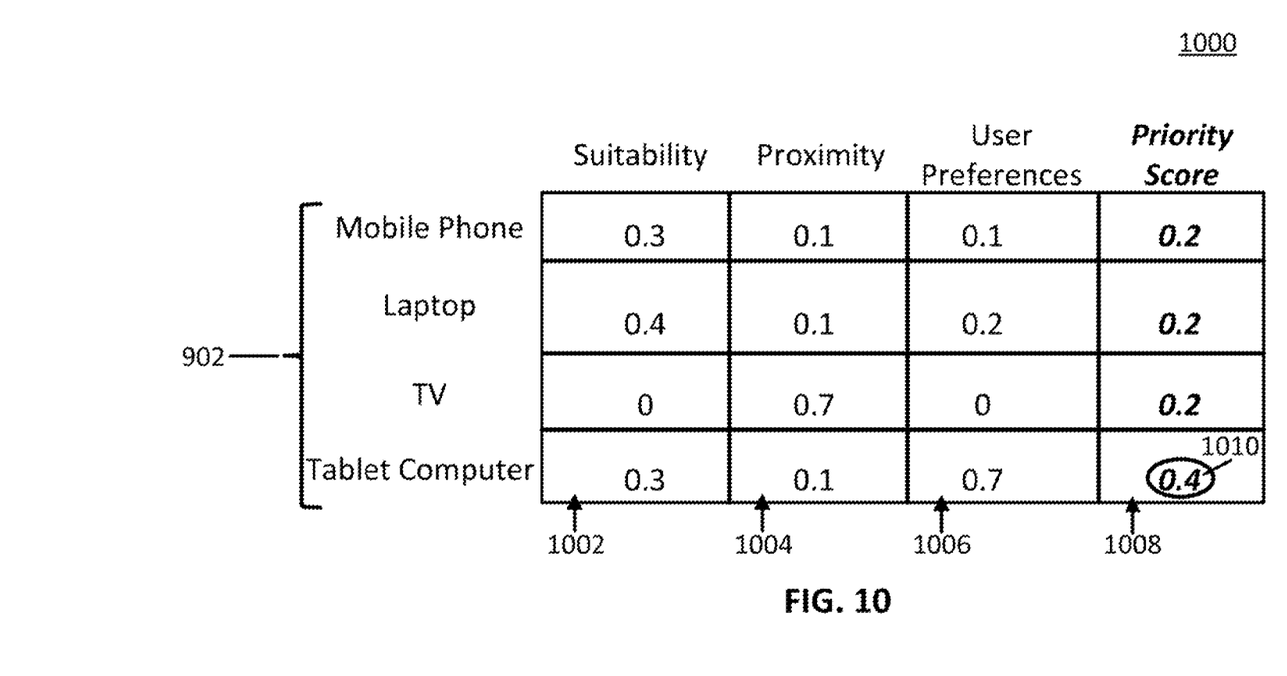
FIG. 10 shows an example of a table of a set of priority scores based on multiple factors in accordance with some implementations of the disclosed subject matter.

The proximity scores can have any suitable format. For example, the set of proximity scores can include a set of ordinal numbers, for example, a ranking of the distances of each of the candidate devices to the source user device. As another example, the set of proximity scores can be on any suitable scale. In some such implementations, the proximity scores can be on a scale indicating distance or signal strength (e.g., two feet, and/or two bars). In some implementations, proximity scores can converted to normalized values on an arbitrary scale (e.g., 0 to 100, 0 to 1, −5 to 5, or any other suitable scale). As a particular example, FIG. 10 shows an example 1000 of a table containing a set of proximity scores 1004 corresponding to the set of candidate devices 902.

Turning back to FIG. 8, process 800 can receive information about a user's preference for various candidate devices at 808. The received information can be any suitable information relevant to a user's preference for a particular user device.

In some implementations, process 800 can receive information about a user's explicitly stated preferences for various candidate devices. For example, the received information can indicate that a user has explicitly specified that all actions of a particular action type should be performed with a particular device. In a more particular example, the received information can indicate that a user has indicated that all actions to make a phone call should be performed by the user's mobile phone. As another particular example, the received information can indicate that a user has specified that all actions to stream media content should be performed by the user's bedroom television when the current time is after 10 p.m.

In some implementations, in instances in which a user has provided consent for the use of past choices regarding various candidate devices, process 800 can receive information about a user's implicit preferences based on past choices for various candidate devices. For example, the received information can indicate that in the past, a user has preferred one candidate user device over another for a particular action type. As a more particular example, the received information can indicate that in the past ten days (or any other suitable time period), a user has preferred to open an e-mail client on the user's laptop. In some such implementations, the received information can include any suitable level of detail. For example, the received information can include information about a user's past choices in the context of time of day, location, and/or any other suitable information. As a more particular example, the received information can indicate that a user has preferred to open an e-mail client on the user's work desktop computer during weekdays but that the user has preferred to open the e-mail client on the user's laptop during weekends. In some such implementations, process 800 can continuously or periodically update and adapt to a user's implicit preferences based on past choices. Such information can be stored in any suitable location, for example, a server 102 (e.g., a data server) and/or on user device 106. In some implementations, such information can be stored for a pre-determined time period (e.g., a day, a week, or any other suitable time period). Additionally or alternatively, in some implementations, information regarding a user's past choices can be modified or deleted at any suitable time of a user's choosing.

In some implementations, in instances in which a user has consented to the use of sensors or other input devices to determine attentional state, process 800 can receive information about a current attentional state of a user. Information about the current attentional state of the user can be determined and received in any suitable manner. For example, the received information can include information indicating a user's current gaze direction. As a more particular example, the received information can indicate that a user is currently looking at the user's mobile phone. As another particular example, the received information can indicate if the user is touching or holding a particular device. In some such implementations, gaze directions and whether a user is touching or is holding a device can be determined based on any suitable sensor or input mechanism, such as cameras, accelerometers, infrared sensors, and/or any other suitable sensor or input mechanism.

In some implementations, the received information about a user's preferences can be quantified. The information can be quantified in any suitable manner. For example, received information regarding explicitly stated preferences, implicit preferences based on past choices, and the current attentional state of a user can be combined to form a score which indicates the user's overall preference for the candidate device for a particular action. In some such implementations, the user preference score for a candidate device can be determined on any suitable scale (e.g., 0 to 100, 0 to 1, or any other suitable scale). Referring to FIG. 10, a more particular example of quantification of user preferences corresponding to the set of candidate devices 902 is shown in set of user preferences 1006.

Turning back to FIG. 8, process 800 can calculate a set of priority scores corresponding to the set of candidate devices at 810. The set of priority scores can be calculated in any suitable manner, can be determined in any suitable format, and can be based on any suitable information. For example, the set of priority scores can be calculated by combining information from multiple factors, such as the set of suitability scores, the set of proximity scores, information about the user's preferences, and/or any other suitable information. As a more particular example, the set of priority scores can be calculated as a weighted sum of the one or more factors, as shown in FIG. 10.

Referring to FIG. 10, table 1000 includes a set of priority scores 1008 calculated based on the set of suitability scores 1002, the set of proximity scores 1004, and the set of user preference scores 1006. In the specific example shown in table 1000, set of priority scores 1008 is calculated as a linear combination of the factors of suitability score, proximity score, and user preference score. Furthermore, in the specific example of FIG. 10, each factor is weighted by an equal weighting factor. In some implementations, the weight applied to each factor can be dynamically adjusted based on the assessed reliability of each factor. For example, if it is determined that information regarding a particular factor (e.g., user preference) is less reliable (e.g., because of lack of data regarding the factor), the factor can be weighted less than other factors when calculating the priority score corresponding to a candidate device.

Turning back to FIG. 8, process 800 can select a target device from the set of candidate devices based on the set of priority scores at 812. In some implementations, process 800 can select the user device(s) with the highest priority score(s) out of the set of candidate devices. For example, process 800 can rank the set of candidate devices based on the set of priority scores and can select one or more target devices based on the ranking (e.g., the user device having the highest priority score, for example, score 1010 as shown in FIG. 10, a set of user devices having the highest scores, and/or any other suitable method of selection). Ties between two equally high priority scores can be resolved in any suitable manner. As a particular example, the target device can be chosen as the device which is closer to the source user device. As yet another particular example, in the event of a tie between two priority scores, the target device can be selected as the device which is receiving a higher degree of user attention at the current time.

FIGS. 6-8 show examples of processes for causing an action to be performed by a user device, detecting nearby user devices, and selecting a target device based on one or more factors in accordance with some implementations. The processes shown in FIG. 6-8 can be executed with components of hardware shown in and described in connection with FIGS. 1 and 2. For example, in some implementations, a source user device 106 can detect other nearby user devices 106 by sending a signal via communication network 104 to a server 102 requesting information regarding nearby user devices. As another example, in some implementations, a target device 106 can be selected to perform an indicated action based on computations performed by a hardware processor 202 on a user device 106 and/or on a server 102.

It should be understood that at least some of the above described blocks of the processes of FIGS. 6-8 can be executed or performed in any order or sequence not limited to the order and sequence shown and described in the figures. Also, some of the above blocks of the processes of FIGS. 6-8 can be executed or performed substantially simultaneously where appropriate or in parallel to reduce latency and processing times. Additionally or alternatively, some of the above described blocks of processes of FIGS. 6-8 can be omitted.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described here collect personal information about users, or may make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A system for causing an action to be performed on a user device, the system comprising:
    a first user device comprising at least one hardware processor that is configured to:
        determine that a second user device is within a predetermined distance range from the first user device;
        receive a user input indicating that a phone call is to be made using a phone number;
        determine a plurality of candidate devices that are capable of making the phone call, wherein the plurality of candidate devices includes the second user device;
        determine a device type of each of the plurality of candidate devices;

determine a proximity of each of the plurality of candidate devices to the first user device;

for each of the plurality of candidate devices, determine a priority associated with the candidate devices at least based on the device type and the proximity to the first user device of the candidate device;

select a target device from the plurality of candidate devices based at least in part on the priority of each of the plurality of candidate devices;

transmit the phone number to the target device; and cause the phone call to be made by the target device using the phone number.

2. The system of claim 1, wherein the plurality of candidate devices includes the first user device.

3. The system of claim 1, wherein the hardware processor is further configured to detect a plurality of user devices in proximity to the first user device.

4. The system of claim 3, wherein the plurality of candidate devices includes the plurality of user devices in proximity to the first user device.

5. The system of claim 1, wherein the hardware processor is further configured to:

connect the first user device to the second user device in response to detecting the second user device; and cause a first user interface to be displayed using the first user device, wherein the first user interface indicates that the first user device is connected to the second user device.

6. The system of claim 1, wherein the hardware processor is further configured to cause a second user interface to be presented using the first user device, wherein the second user interface indicates that the action will be performed by the target device.

7. The system of claim 1, wherein the first user device is further configured to, for each of the plurality of candidate devices, determine a priority score for the candidate device at least based on the device type of the candidate device and the proximity to the first user device of the candidate device, wherein the priority determined for the candidate device is based on the priority score.

8. A method for causing an action to be performed on a user device, comprising:

determining that a second user device is within a predetermined distance range from the first user device;

receiving a user input indicating that a phone call is to be made using a phone number;

determining a plurality of candidate devices that are capable of making the phone call, wherein the plurality of candidate devices includes the second user device;

determining a device type of each of the plurality of candidate devices;

determining a proximity of each of the plurality of candidate devices to the first user device;

for each of the plurality of candidate devices, determining a priority associated with the candidate device at least based on the device type and the proximity to the first user device of the candidate device;

selecting a target device from the plurality of candidate devices based at least in part on the priority of each of the plurality of candidate devices;

transmitting the phone number to the target device; and causing the phone call to be made by the target device using the phone number.

9. The method of claim 8, wherein the plurality of candidate devices includes the first user device.

10. The method of claim 8, further comprising detecting a plurality of user devices in proximity to the first user device.

11. The method of claim 10, wherein the plurality of candidate devices includes the plurality of user devices in proximity to the first user device.

12. The method of claim 8, further comprising:

connecting the first user device to the second user device in response to detecting the second user device; and causing a first user interface to be displayed using the first user device, wherein the first user interface indicates that the first user device is connected to the second user device.

13. The method of claim 8, further comprising causing a second user interface to be presented using the first user device, wherein the second user interface indicates that the action will be performed by the target device.

14. The method of claim 8, further comprising, for each of the plurality of candidate devices, determining a priority score for the candidate device at least based on the device type of the candidate device and the proximity to the first user device of the candidate device, wherein the priority determined for the candidate device is based on the priority score.

15. A non-transitory computer-readable medium containing computer executable instructions that, when executed by a processor, cause the processor to perform a method for causing an action to be performed on a user device, the method comprising:

determining that a second user device is within a predetermined distance range from the first user device;

receiving a user input indicating that a phone call is to be made using a phone number;

determining a plurality of candidate devices that are capable of performing the action, wherein the plurality of candidate devices includes the second user device;

determining a device type of each of the plurality of candidate devices;

determining a proximity of each of the plurality of candidate devices to the first user device;

for each of the plurality of candidate devices, determining a priority associated with the candidate device at least based on the device type and the proximity to the first user device of the candidate device;

selecting a target device from the plurality of candidate devices based at least in part on the priority of each of the plurality of candidate devices;

transmitting the phone number to the target device; and causing the phone call to be made by the target device using the phone number.

16. The non-transitory computer-readable medium of claim 15, wherein the plurality of candidate devices includes the first user device.

17. The non-transitory computer-readable medium of claim 15, wherein the method further comprises detecting a plurality of user devices in proximity to the first user device.

18. The non-transitory computer-readable medium of claim 17, wherein the plurality of candidate devices includes the plurality of user devices in proximity to the first user device.

19. The non-transitory computer-readable medium of claim 15, wherein the method further comprises:

connecting the first user device to the second user device in response to detecting the second user device; and causing a first user interface to be displayed using the first user device, wherein the first user interface indicates that the first user device is connected to the second user device.

20. The non-transitory computer-readable medium of claim 15, wherein the method further comprises causing a second user interface to be presented using the first user device, wherein the second user interface indicates that the action will be performed by the target device.

21. The non-transitory computer-readable medium of claim 15, where in the method further comprises, for each of the plurality of candidate devices, determining a priority score for the candidate device at least based on the device type of the candidate device and the proximity to the first user device of the candidate device, wherein the priority determined for the candidate device is based on the priority score.

* * * * *